Patented Jan. 19, 1926.

1,570,537

UNITED STATES PATENT OFFICE.

CLARK S. TEITSWORTH, OF LOMPOC, CALIFORNIA, ASSIGNOR TO THE CELITE COMPANY, OF LOS ANGELES, CALIFORNIA, A CORPORATION OF DELAWARE.

ABSORBENT MATERIAL AND PROCESS OF MAKING SAME.

No Drawing.   Application filed March 27, 1924.   Serial No. 702,474.

*To all whom it may concern:*

Be it known that I, CLARK S. TEITSWORTH, a citizen of the United States, residing at Lompoc, in the county of Santa Barbara and State of California, have invented a new and useful Absorbent Material and Process of Making Same, of which the following is a specification.

This invention relates to the preparation of an improved absorbent or adsorbent material for use in the absorption or adsorption of industrial vapors such as gasoline, toluene, water and others and of objectionable odors such as packing house, tannery or glue factory gases. Material produced in accordance with this invention may also be successfully used in the selective adsorption of coloring matter from liquids.

The principal object of this invention is the preparation and use of an absorbent and adsorbent material which has a higher capacity or efficiency for adsorption of vapors, gases or coloring matter than has been possible to obtain with the materials heretofore used. I have found that by incorporating a porous but relatively rigid material in a silica gel or by producing such silica gel on the surface of porous bodies, a material of superior adsorbing properties is produced.

When the surface of a solid particle comes in contact with a gas or a liquid, some of each of the constituents of the gas or liquid is adsorbed or dissolved in the surface of the layer of the solid. The extent to which adsorption takes place is influenced by the chemical nature and physical condition of the two phases in contact and very often only one constituent of the gaseous or liquid phase is adsorbed selectively. This latter action is extensively used during warfare for adsorption of poison gas by charcoal in gas masks. The amount of adsorption in any given case is directly proportional to the area of the capillary contact surface, but as stated above, the proportionality constants are dependent upon the physical, chemical and thermodynamic aspects of the phases and it is possible to obtain all types of adsorption, from zero adsorption to complete solution.

Adsorptive materials such as animal charcoal or bone black and vegetable carbons as well as ferric and aluminum oxide are well known and used to a considerable extent in the industries. An adsorbent material having greater capacity than the above materials may be made by producing a silica gel which is essentially a very finely divided, microscopically porous silica. Silica gel is the gelatinous precipitate formed by the liberation of silicic acid from water glass with acid under carefully controlled conditions. The reaction has been assumed to be $$Na_2O.3SiO_2 + 2HCl + 2H_2O \rightarrow 2NaCl + 3H_2SiO_3.$$
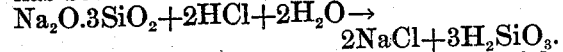

After setting to a gel, or a hydrated, jellylike mass, the silicic acid is washed with water until substantially free from salt, and then partially dehydrated by heating to 300–400° C. resulting in a glassy, sand like product which has a relatively large capillary surface area.

Silica gel, although used to some extent, is limited by its relatively low capacity for retaining vapors. Thus, I have determined that at 20° C., at saturation vapor pressure, it is capable of adsorbing only 20% of its weight of gasoline vapor or 28 per cent of its weight of water vapor. My invention comprises the production of an adsorbent material in which a greater surface is presented and adsorption equilibrium is not reached until a very much larger quantity of vapor or gas has been adsorbed than is possible to adsorb with the materials now in use.

I have found that by coating porous, rigid particles with an inorganic gel such as silica gel, aluminum hydroxide etc., an adsorbent is produced which has almost twice as great capacity as any material now on the market. For the base of my adsorbent I use pumice, tufa, or any vesicular material, artificially produced porous bodies such as earthenware or brick, or preferably heated or raw diatomaceous earth. By diatomaceous earth I mean that material otherwise designated as kieselguhr, infusorial earth, fossil meal or flour, tripoli, diatomite, etc.

In preparing an adsorbent with silica gel I use water glass, otherwise known as sodium silicate or silicate of soda or any soluble silicate and an acid such as dilute hydrochloric or sulfuric. As an example a sodium silicate of about 1.16 specific gravity containing 13.5 per cent silica by weight, may be used with an aqueous solution containing 10 per cent HCl by weight. A porous material such as diatomaceous earth ground to pass eight mesh is mixed with the water glass and the mixture heated to about 50° C. The hydrochloric acid solution is also heated to 50° C., and the silicate mixture is then added to it while stirring rapidly. Soon after such mixture of silicate suspension and acid a jellying or gelatinizing action takes place and I have found that stirring for a short while when gelling starts assures a uniform distribution of diatomaceous earth in the final product. The gel is next washed with water until substantially free of soluble substances and activated for use by heating gradually to about 300° C.

With such gel mixtures as above described, I have absorbed water from air saturated with water vapor at 20° C. to the extent of 83 per cent of the total weight of gel and diatomaceous earth. The adsorption efficiency of such gels remains high nearly to the vapor saturation value for the adsorbent.

This invention is not limited by any preferred theory as to why the addition of solid particles so greatly improves the properties of adsorbent gels. The adsorptive capacity for vapors of the diatomaceous earth, pumice or other vesicular material per se is low; in addition, I use only small proportions of these materials. The action might be explained to be due to the increased porosity or increased pore volume introduced by the diatomaceous earth or its substitute, since diatomaceous earth, in particular, is known to be highly porous. Likewise it might be regarded as due to increased surface of the adsorbent. Still another theory might attempt explanation of the phenomenon on the basis of a point or surface action such as is assumed in certain types of catalysis. That the increased efficiency of my adsorbent is not due to the method of preparation of the gel proper, is shown by preparation, without the addition of the solid material, of a gel of low efficiency, like those now in commercial use.

I have found that the addition of even a small amount, say 2 per cent by weight, of a porous supporting material materially increases the total adsorption at equilibrium and also the rate of adsorption. The addition of 60 per cent by weight of the porous supporting material gives an adsorbent having an efficiency, based on total weight of sample, equal to the pure silica gels of commerce, so that when the efficiency is calculated on the gel weight present in my adsorbent, it gives a much higher efficiency constant. For most industrial operations I find that a gel made on about 3 per cent by weight of finely divided pumice or diatomaceous earth is most adaptable.

A material having larger pores, such as those found in burned clay products in which voids have been created by the carbonization of organic or combustible matter, produces very good results for some purposes. The diatomaceous earth used may be in the form of a powder or it may be coarsely ground to give lumps as large as a pea and finer. In order to give rigidity, the diatomaceous earth may be calcined or otherwise treated before or after grinding.

It is not possible for me to limit myself to a definite composition for the preparation of my adsorbent in that the industrial applications thereof require materials having physical characteristics dependent upon the use to which they are to be applied. Some industries require an adsorbent having large or coarse particles to allow gases to pass freely through a bed of adsorbent, others require a finely divided material. For this reason I may use either a finely ground porous substance as a base, or a coarse one. For the same reason it may be possible for one to use as much as 60 per cent or only 2 per cent of the porous substance.

Whenever a very efficient, rapid adsorbent is required, the following procedure is preferable in its preparation. A soluble silicate such as, for example, sodium silicate of 1.16 specific gravity and containing 13.5 per cent silica by weight, is heated to about 50° C. and finely divided diatomaceous earth is added thereto in the proportion of 0.5 pound of diatomaceous earth to 100 pounds of silicate. An aqueous solution of hydrochloric acid containing 10 per cent HCl by weight, after having been previously heated to 50° C. is then mixed with the suspension of diatomaceous earth in silicate, in sufficient amount to precipitate the silica in the form of silicic acid. The mixture should be agitated during addition of hydrochloric acid and when the silicic acid starts to precipitate and gel to a solid formation, the mixture may be again agitated for a few minutes. After thoroughly setting, the silica gel is leached with water to remove all soluble salts formed during the reaction, or what excess acid is present. The silica gel is then transferred to a dryer or oven, where it is partly dehydrated and activated by gradually heating up to 300° C.

My adsorbent may be easily prepared on a commercial scale in the usual types of industrial equipment consisting of tanks, agitators, heating coils, roasting furnaces, screening devices, etc. I do not wish to limit this invention to any definite type of equipment as location and conditions of plant manufacture influence the apparatus which may be used. The arrangement, however, should include means for heating the sodium silicate and acid, agitating tanks for mixing the silicate and solid or porous supporting material, leaching or washing equipment, screens, dryers, etc.

Adsorbent materials such as above described are used extensively in the industries, for example: air drying and conditioning for dehydrating equipment or dry-air blast for furnaces; gasoline recovery from gas wells, casinghead gases, storage tanks, recovery units, etc.; for solvent recovery in the industries using them in oil extraction etc.; petroleum refining, removal of sulfur from gasoline, etc.; recovery of industrial vapors such as nitrous oxides, sulfur dioxide, etc.; separation of mixed gases by selective action; decolorization and bleaching, etc.

What I claim is:

1. The process of preparing a silica gel which consists in allowing silicic acid to set to a gel in contact with an added porous substance.

2. The process of preparing a silica gel which consists in allowing silicic acid to set to a gel in contact with diatomaceous earth.

3. The process of preparing a silica gel which consists in allowing silicic acid to set to a gel contact with diatomaceous earth which has been calcined and ground.

4. The process of preparing a silica gel which consists in treating a solution of soluble silicate with an acid and allowing the resulting silicic acid to set to a gel in the presence of an added, suspended, porous substance.

5. The process of preparing a silica gel which consists in mixing a solution of soluble silicate of about 1.16 specific gravity with a porous substance in the proportion of 100 pounds of silicate to 9 pounds of porous substance, warming to 50° C., mixing the suspension with a 10 per cent solution of hydrochloric acid previously heated to 50° C., in such quantity as to liberate substantially all the silicic acid from the silicate, stirring just previous to the setting of the gel, washing the gel with water and heating slowly to 300° C.

6. The herein described improvement in the process of preparing an adsorbent gel, consisting in adding a porous supporting material to a silicate solution before mixing it with acid.

7. The herein described improvement in the process of preparing an adsorbent gel, consisting in adding diatomaceous earth to a silicate solution before mixing said solution with acid.

8. The herein described process consisting in adding to a soluble silicate a granular porous supporting material; and then treating such mixture with an acid solution to form a silica gel coating the porous material.

9. The herein described process consisting in adding to a water glass a porous supporting material; then treating such mixture with hydrochloric acid to precipitate the silicate in the form of a colloid and form a silica gel coating the surfaces of the porous material.

10. The herein described process consisting in adding diatomaceous earth to a solution of soluble silicate; treating this mixture with an acid to produce an adsorbent gel coating the diatomaceous earth; and eliminating the soluble substances.

11. An adsorbing material comprising porous material coated with an adsorbent gel.

12. An adsorbing material comprising porous material coated with a silicate gel.

13. An improved adsorbing material comprising diatomaceous earth coated with an adsorbent gel.

14. In the process of preparing an adsorbent material, the improvement consisting in adding porous material to a solution of soluble silicate; treating this mixture with an acid to produce an adsorbent gel coating the porous material; eliminating the soluble substances; and slowly heating the resultant product to about 300° C.

15. The herein described improvement in the process of preparing an adsorbent gel, consisting in adding diatomaceous earth to a solution of soluble silicate; then treating this mixture with an acid to produce an adsorbent gel coating the diatomaceous earth; eliminating the soluble substances; and slowly heating the resultant product to about 300° C.

16. An adsorbent material comprising a porous material coated with a silica gel, from which water soluble substances have been substantially removed.

17. An adsorbing material comprising particles of diatomaceous earth coated with a silica gel, from which water soluble substances have been substantially removed.

18. As an article of manufacture a porous supporting material coated with an adsorbent gel; produced by adding a porous supporting material to a soluble silicate, and then treating the mixture with an acid.

19. As an article of manufacture a porous supporting material coated with an adsorbent gel; produced by adding a granular porous supporting material to a solution of soluble silicate, treating the mixture with an acid to produce an adsorbent gel, and eliminating the water soluble substances.

20. As an article of manufacture, a porous material consisting of diatomaceous earth coated with an adsorbent gel; produced by adding diatomaceous earth to a soluble silicate; and then treating the mixture with an acid.

21. As an article of manufacture, a porous material consisting of diatomaceous earth coated with an adsorbent gel; produced by adding diatomaceous earth to a solution of soluble silicate, treating the mixture with an acid to produce an adsorbent gel, and eliminating the water soluble substances.

In testimony whereof I have hereunto subscribed my name this fifteenth day of March, 1924.

CLARK S. TEITSWORTH